July 25, 1939.  M. E. NULSEN ET AL  2,167,084
ELECTRIC POTENTIAL CONVERTER AND CIRCUITS THEREFOR
Filed Oct. 24, 1936  3 Sheets-Sheet 1

INVENTORS
Marvin E. Nulsen
BY Donald H. Mitchell
ATTORNEY

Fig. 3
Fig. 4
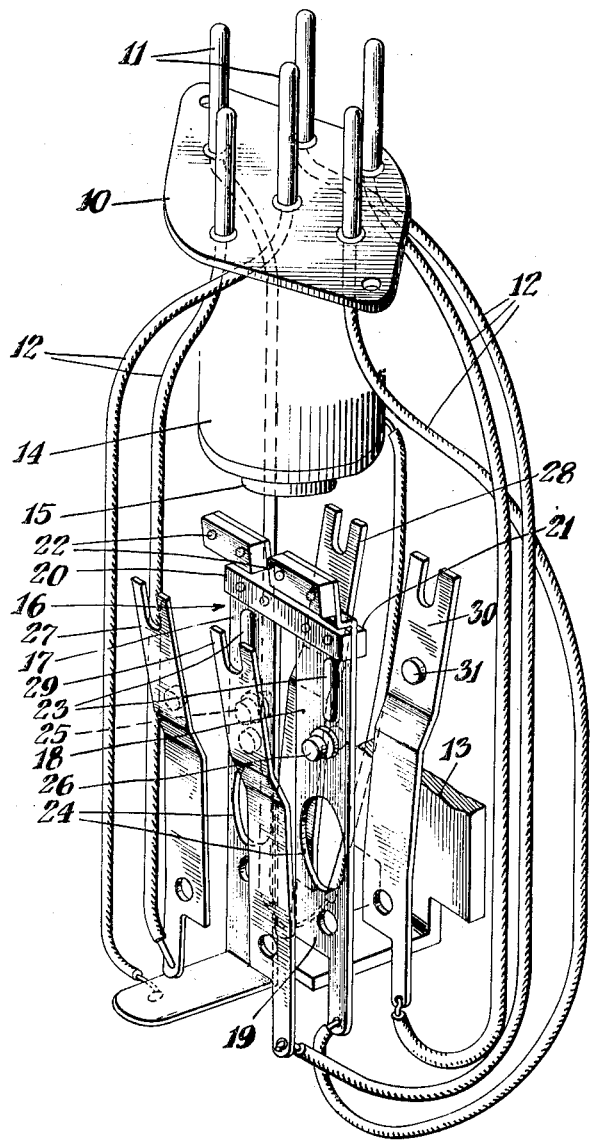
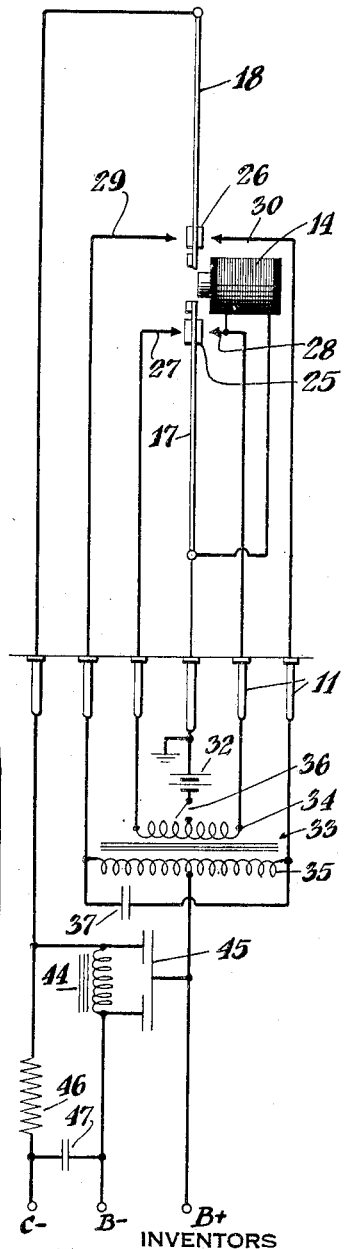
INVENTORS
Marvin E. Nulsen
BY Donald H. Mitchell
ATTORNEY July 25, 1939.  M. E. NULSEN ET AL  2,167,084
ELECTRIC POTENTIAL CONVERTER AND CIRCUITS THEREFOR
Filed Oct. 24, 1936  3 Sheets-Sheet 3
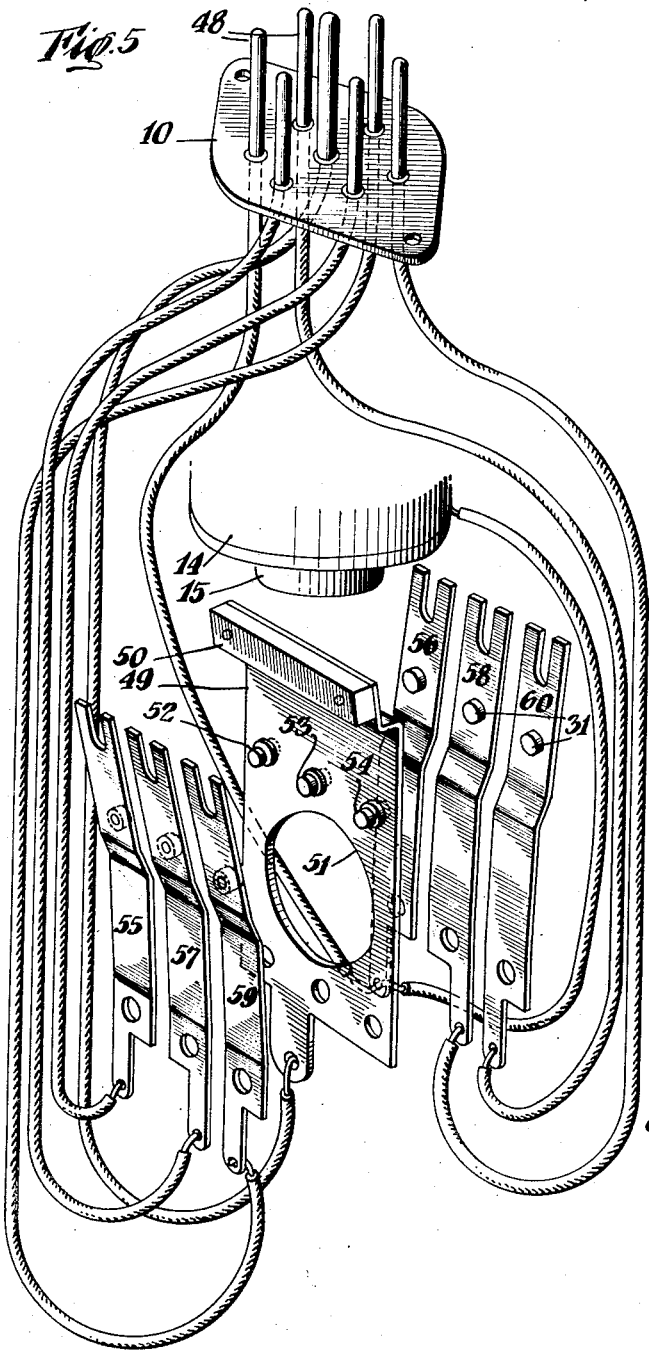
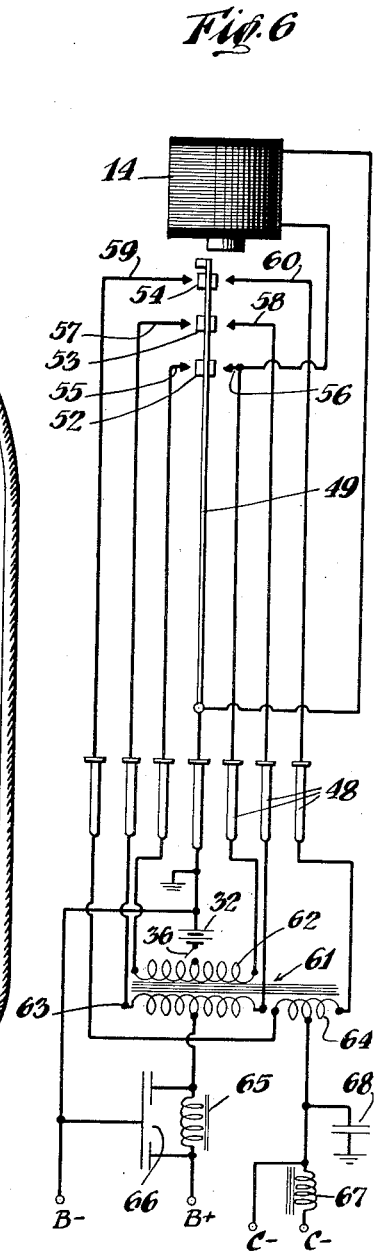
INVENTORS
*Marvin E. Nulsen*
BY *Donald H. Mitchell*
ATTORNEY Patented July 25, 1939

2,167,084

UNITED STATES PATENT OFFICE 2,167,084

ELECTRIC POTENTIAL CONVERTER AND CIRCUITS THEREFOR

Marvin E. Nulsen, Indianapolis, Ind., and Donald H. Mitchell, Chicago, Ill., assignors to P. R. Mallory & Co., Inc., Indianapolis, Ind., a corporation of Delaware Application October 24, 1936, Serial No. 107,358

10 Claims. (Cl. 171—97)

This invention relates to electric potential converters and circuits therefor and more particularly to devices and circuits for converting electric voltages or currents of one value or character into electric voltages or currents of another value or character.

Such converters may be in the form of electromagnetic vibrators and may find application in potential supplying devices for automobile radio sets and the like wherein they serve to convert the low voltage of the automobile battery into voltages suitable for biasing the electrodes of the vacuum tubes in the radio set.

An object of the invention is to convert electric voltages or currents of one character or value into electric voltages or currents of another value or character.

Another object is to produce an improved vibrator structure and circuit for a converter of the type set forth.

A further object is to provide a converter having a plurality of output voltages.

A still further object is to supply radio "B" and "C" bias potentials from a single low-voltage source.

An additional object is to provide a converter having the primary and secondary circuits thereof conductively isolated.

Other objects of the invention will be apparent from the following description and accompanying drawings taken in connection with the appended claims.

According to one embodiment the invention may comprise a vibrator device and transformer arranged in a circuit for converting low voltages from a battery source into voltages suitable for radio "B" and radio "C" bias.

The invention accordingly comprises the features of construction, combination of elements, arrangements of parts, and methods of manufacture referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which:

Figure 3 is a perspective exploded view, with parts broken away, of said vibrator device;

Figure 4 is a diagrammatic view of a modified circuit;

Figure 5 is a perspective exploded view, with parts broken away, of a modified vibrator device embodying the invention; and Figure 6 is a diagrammatic view of the circuits therefor.

Like reference characters denote like parts in the several figures of the drawings.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Figure 1:
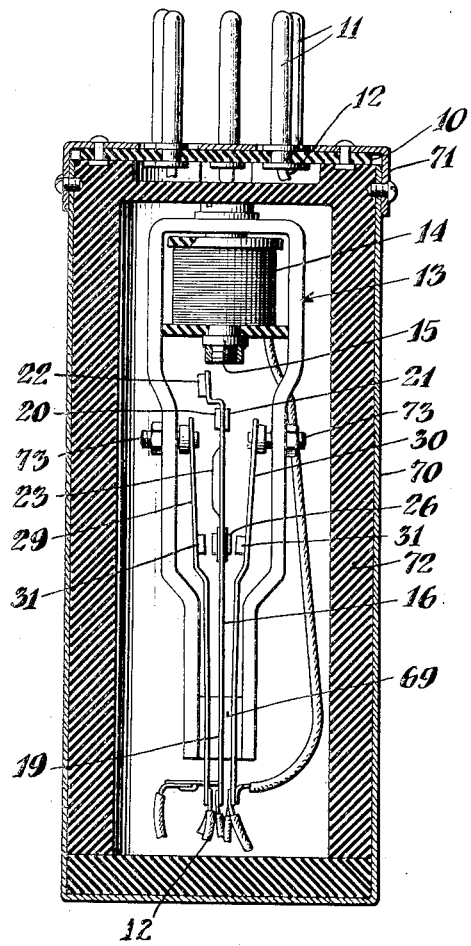
Figure 1 is a sectional elevation of a vibrator device according to the present invention.

Referring to the drawings, Figure 1 shows the vibrator unit having a metal case 70 with a metal cover 71, to which is riveted base plate 10 of insulating material carrying a plurality of prongs 11 for connecting the vibrator elements to the external circuit. Prongs 11 are connected to the various vibrator parts by conductors 12 suitably insulated from the vibrator frame structure 13. Six prongs are required for the circuits shown in Figures 2 and 4.

Vibrator frame 13 is resiliently supported within metal case 70 by a lining 72 of soft resilient material, such as sponge rubber. This lining also serves to insulate the vibrator parts both electrically and acoustically. Supported by the frame structure 13 is an electromagnet 14 having a pole 15, and a split reed member 16 adapted to be vibrated by the electromagnet.

Figure 3 illustrates the operating parts of the vibrator structure in exploded perspective view. The reed member 16 comprises a pair of reeds 17 and 18 rigidly clamped at their base 19 by a stack of insulating strips 69 (Figure 1) clamped between the ends of the frame member. Reeds 17 and 18 are mechanically connected together but electrically insulated by a pair of strips of insulation 20 and 21 riveted to the reeds near the free ends thereof. The reeds are provided with a pair of pole pieces 22 of magnetically permeable material, such as iron, so that they may be vibrated responsive to interrupted impulses of electromagnet 14. The insulation strips 20 and 21 serve to keep two reeds in the same plane so that they will vibrate in unison.

Reeds 17 and 18 are provided with stiffening ribs 23 and cut-away portions such as holes or openings 24 in order to control their flexibility. The cut-away portions are provided where the maximum bending is desired and the ribs are provided to strengthen the reeds at points where breakage might otherwise occur.

Reeds 17 and 18 are provided with double-faced contacts 25 and 26 respectively, secured to the mid-portions of the reeds. These provide electrical contact between the reeds and a plurality of contact springs responsive to vibrations of the reed member. Four of these contact springs are provided, all insulated from each other and connected to separate prongs 11. One pair of contact springs 27 and 28 are mounted on opposite sides of reed 17 and carry single-faced contact discs 31, arranged to co-operate with double-faced contact 25 during the vibrations of the reed. Thus it will be seen that as the reed vibrates back and forth the double-faced contact 25 will make contact alternately with contact springs 27 and 28.

A second pair of contact springs 29 and 30 are arranged similarly to springs 27 and 28 on the opposite sides of reed 18, and are provided with contact discs 31, arranged to co-operate during vibration of the reed, with the double-faced contact 26 in a similar manner. Since reeds 17 and 18 are clamped together at their free ends it will be obvious that they will vibrate as a unit so that contacts 25 and 26 first come into contact with spring members 27 and 29 and then into contact with spring members 28 and 30. The contact spacing may be adjusted by adjusting screws 73 (Figure 1) so as to allow the two reeds to make contact with the two contact springs on either side simultaneously or to make contact with one spring shortly before the other.

Figure 2:
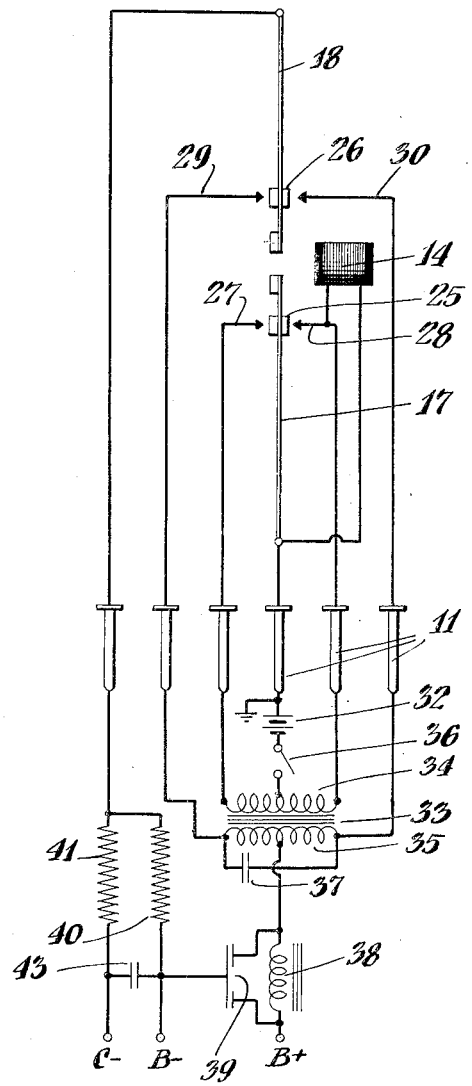
Figure 2 is a diagrammatic view of the circuits therefor.

The preferred circuit according to the present invention is shown in Figure 2 wherein parts of the vibrator structure are shown diagrammatically with their circuit connections. Prongs 11 provide the desired connections with the external circuit. Reed contact 25 is connected through reed 17 to one end of the winding of electromagnet 14 and also, through one of prongs 11, to the grounded side of a battery 32. The other side of battery 32 is connected through a switch 36 to the center tap of a primary winding 34 of transformer 33. This transformer is provided with a high potential secondary winding 35. The ends of primary winding 34 are connected respectively to contact springs 27 and 28. Spring 28 is also connected to the other end of the winding of electromagnet 14. The ends of secondary winding 35 are connected to contact springs 29 and 30 respectively.

A condenser 37 may be connected across the secondary winding 35 if desired and may have such capacity as to adjust the phase of the currents in secondary winding 35 in a desired manner. A center tap on secondary winding 35 is connected directly with the output circuit and may provide, for example, the B+ potential conductor for the radio power supply circuit. A choke coil 38 is provided in series with this conductor and a condenser 39 is associated therewith. Condenser 39 has a common cathode connected directly to B— (B— may or may not be grounded) and two anodes, one connected to each end of the winding of choke coil 38. It will be obvious, of course, that two separate condensers can be used in place of common cathode condenser 39.

Reed contact 26 is connected through reed 18, one of the prongs 11 and resistance 40 to the B— potential conductor for the radio set power supply circuit.

The circuit shown in Figure 2 functions as follows: When switch 36 is closed electric current from battery 32 flows through the right half of primary winding 34 and the winding of electromagnet 14 in series and back to ground on the positive side of battery 32. This energizes electromagnet 14, which has a comparatively high resistance winding, and causes this magnet to attract the reeds 17 and 18, thereby causing contacts 25 and 26 to make contact with springs 28 and 30 respectively. Contacts 25, 28 short circuit the winding of electromagnet 14, thereby removing the resistance in series with the right half of winding 34 and allowing more current to flow therein. The increase in current in the right half of winding 34 induces a potential difference across the terminals of secondary winding 35.

Contacts 26, 30, in closing, provide a circuit for supplying the potential difference induced in secondary winding 35 to the output circuit. The "B" and "C" potentials for the radio set is thereby supplied through the following circuit: From the B+ output terminal through choke coil 38, the right half of winding 35, contact spring 30, contact 26, reed 18 and resistance 40 to the B— terminal.

The C— bias potential is provided by the potential drop in resistance 40, the C— output terminal being connected to the input end of resistance 40 through filter resistance 41. An iron core choke might be used in place of resistance 41. Condenser 43 comprises the other part of "C" filter.

Upon the short circuiting of electromagnet 14 the reeds 17 and 18 are no longer attracted by this magnet and in consequence reeds 17 and 18 swing back, thereby opening the contacts previously made and closing contacts 25, 27 and 26, 29 respectively. The current thereupon falls to zero in the right half of primary winding 34 and a current builds up in the left half of this winding as a result of the closure of an energizing circuit for the left half of winding 34 through contacts 25, 27. This change in primary current causes a reversal of the potential drop across secondary winding 35. The connections to winding 35 are also reversed, however, by the opening of contacts 26, 30 and the closing of contacts 26, 29. Thus the output circuit is now connected through the left half of secondary winding 35, but the polarity at the output terminals remains the same.

The reed assembly now swings back to the first contacts under the influence of electromagnet 14 whose circuit has again become energized and the vibrator cycle is repeated periodically as long as switch 36 remains closed.

Condenser 39, co-operates with choke coil 38 to filter out fluctuations in potential in the "B" output circuit and condenser 43 co-operates with resistance 41 to filter out fluctuations in the "C" ouput circuit, "B—" terminal being common to both so that substantially constant direct current potentials are provided at the output terminals.

The circuit shown in Figure 4 is similar in general to that of Figure 2, but is adapted for use with a common anode condenser 45 instead of the common cathode condenser 39 used in the previous circuit. The center tap of secondary winding 35 is connected directly to the B+ output terminal. Contact 26 is connected to the B— output terminal through choke coil 44 and to the C— output terminal through filter resistance 46. The common anode of condenser 45 is connected to the B+ output conductor and the two cathodes of this condenser are connected to the ends of winding of choke coil 44. A condenser 47 is connected between the C— output terminal and B— terminal (B— may or may not be grounded). The vibrator operates in the same manner as already described, to supply a constant B— bias. C— bias is obtained from the potential drop in choke coil 44.

Condensers 45 and 47 co-operate respectively with choke coil 44 and resistance 46 to smooth out the potential fluctuations in the output circuit so that substantially constant output potentials are provided.

In the modification shown in Figure 5, the vibrator structure may be the same as is shown in Figure 1, with the exception of the differences in some of the parts as set forth in Figure 5. Insulating base plate 10 is in this case provided with a plurality of prongs 48. Seven prongs are required for the circuit of Figure 6. Instead of a split reed a single wide reed 49 is provided. While this reed will ordinarily be somewhat wider than the reeds shown in Figure 3, its width has been greatly exaggerated in Figure 5 in order that the details of the structure may be more clearly shown. Reed 49 is provided with a pole piece 50 of magnetic permeable material and may have a hole 51 cut therein to increase the flexibility of the lower part of the reed. Three double faced contacts 52, 53 and 54 are provided in the central portion of the reed to co-operate with the six contact springs. Contact springs 55, 57 and 59 are all mounted on one side of the reed and insulated from each other and are provided with contact discs 31 to make contact with reed contacts 52, 53 and 54 respectively. Contact springs 56, 58 and 60 similarly arranged on the other side of the reed to make contact with reed contacts 52, 53 and 54 respectively on this side of the reed. The contact springs on each side of the reed can be adjusted in a manner similar to that shown in Figure 1 so that the reed contacts will meet the contact faces on all three springs simultaneously or in any sequence desired.

Figure 6 shows the preferred circuit in which the vibrator structure of Figure 5 may be utilized. All three reed contacts 52, 53 and 54 are connected through the reed 49 to one end of the winding of electromagnet 14 and through one of the prongs 48 to ground at the terminal of the battery. Battery 32 is connected through switch 36 with the center tap of primary winding 62 of transformer 61. The two ends of winding 62 are connected respectively to contact springs 55 and 56. Contact spring 56 is also connected to the other end of the winding of electromagnet 14.

Transformer 61 is provided with two secondary windings, 63 and 64. The two ends of the first secondary winding 63 are connected respectively to contact springs 57 and 58. The two ends of the secondary winding 64 are connected respectively to contact springs 59 and 60. The center tap of secondary winding 63 is connected through choke 65 to the B+ output terminal. The B— output terminal is connected to ground. The common cathode of condenser 66 is connected directly to ground (B—) and the two anodes of this condenser are connected to the ends of choke 65. The center tap of secondary winding 64 is connected to the C— output terminal, either directly or through a choke coil 67, as required. A condenser 68 is connected between the center tap of winding 64 and ground. Interchange the ends of the secondary windings in their connection to rectifier springs to control polarity of output.

In the operation of the circuit shown in Figure 6, when switch 36 is closed, current from battery 32 flows through the right half of winding 62 and through the winding of electromagnet 14 and back to the grounded side of battery 32. The electromagnet 14 thereby attracts the reed 49, whereupon the reed contacts make contact with springs 56, 58 and 60. The closing of contacts 52, 56 short-circuit the winding of electromagnet 14, thereby allowing a greater current to flow in the right half of winding 62. The increase in current in winding 62 induces a potential drop across secondary winding 63 and also across secondary winding 64. Contacts 53, 58, in closing, connect the right half of secondary winding 63 into the output circuit so that the potential drop therein will provide a "B" potential supply to the output circuit.

The "B" potential circuit is as follows: From the B+ terminal through choke 65, the right half of winding 63, contact spring 58, contact 53, read 49 to ground and from ground to the B— output terminal.

Contacts 54, 60 in closing connect the right half of secondary winding 64 to the "C" potential supply circuit. The C— bias supply circuit is as follows: From the C— output terminal through the right half of winding 64, contact spring 60, contact 54 and reed 49 to ground.

Upon short-circuiting and the consequent de-energization of electromagnet 14, reed 49 returns through center position and swings beyond this position into contact with springs 55, 57 and 59. This changes the connections from the right half of transformer windings 62, 63 and 64 to the left half of these windings. The change in current in primary winding 62 causes a reversal of the polarity of the potential drop across secondary windings 63 and 64, but due to the reversal of their connections the polarities in the output circuit remain the same.

It is possible, of course, to simplify the circuits by discarding one-half of each winding of the transformer so that the vibrator circuit operates as a half-wave unit. Likewise primary 62 and secondary 63 may be as shown and one-half of the winding of secondary 64 may be eliminated together with one of contacts 59 and 60 so that the "C" bias circuit will operate on a half-wave circuit and the remaining parts will operate on a full-wave circuit.

It will be apparent that a structure and circuit has been provided which is admirably adapted to provide both "B" and "C" bias potentials to a radio set from a low voltage source.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. An electric current converter system comprising a primary circuit including a primary transformer winding, a direct current source arranged so as to supply current to said primary winding and interrupter means arranged so as to produce variations in the current flowing in said winding, a secondary circuit conductively isolated from said primary circuit and including a secondary transformer winding arranged in inductive relation with said primary winding, output terminals fed by said secondary winding, interrupter means between said secondary winding and said output terminals, actuating means to operate said primary and secondary interrupter means in unison whereby said primary interrupter means will produce periodic variations in the current flowing in said primary winding and said secondary interrupter means will simultaneously rectify the current produced in said secondary circuit, and voltage dividing means in said output circuit to provide different potentials on at least three output terminals.

2. An electric current converter system comprising a primary circuit including a transformer primary winding and a current source arranged so as to supply current to said winding, a secondary circuit including a transformer secondary winding in inductive relation with said primary winding, and a vibratory device comprising an armature member having two contacts thereon, said contacts being mechanically connected together but electrically insulated from each other, two contacts mounted to co-operate with said two armature contacts and an electromagnet arranged so as to vibrate said armature, the first pair of said co-operating contacts being connected in said primary circuit and the second pair of said co-operating contacts being connected in said secondary circuit.

3. An electric current converter system comprising a primary circuit including a transformer primary winding, a current source arranged so as to supply current to said winding and a pair of interrupter contacts arranged so as to vary the current in said winding, a secondary circuit isolated from said primary circuit and including a transformer secondary winding in inductive relation with said primary windings and a second pair of interrupter contacts arranged so as to interrupt the current produced by said secondary winding, a link member of insulating material mechanically linking one contact of said first pair with one contact of said second pair and actuating means arranged to operate said linked contacts as a unit to cause interruptions of said two pairs of interrupter contacts in proper synchronization.

4. An electric current converter comprising a primary circuit including a transformer primary winding, a current source arranged so as to supply current to said winding and an interrupter device arranged so as to vary the current in said winding, said device comprising a vibratory member having a pair of reeds both clamped at one end and having their other ends free to vibrate and a link member of insulating material mechanically linking said free ends together, a contact on one of said reeds and a co-operating contact, therefor, mounted adjacent said reed, said contacts being connected in said primary circuit, a secondary circuit including a transformer secondary arranged in inductive relation with said primary, a second reed contact on the other of said reeds and a second co-operating contact, therefor, mounted adjacent said second other reed, said second contacts being connected in said secondary circuit.

5. In a device of the character described for changing direct current of one voltage to direct current of another voltage, the combination of a series connected circuit including a source of direct current and a transformer primary winding, vibratory means responsive to an intermittent electromagnetic field, and switch means actuated by said vibratory means for controlling effective energization of said winding, said switch means causing periodic variation of the current from said source flowing through said winding; a second series-connected circuit including a transformer secondary winding arranged in inductive relation to said primary winding, a translating circuit, second switch means actuated by said vibratory means and insulated from said first switch means for producing periodic interruptions in said second circuit whereby the current fed to said translating circuit is unidirectional.

6. An electric current converter system for supplying "B" and "C" bias potentials to a radio set from a single low-voltage direct current source comprising a series circuit including a direct current voltage source, a transformer primary winding and a pair of interrupter contacts, a second series circuit including a transformer secondary winding arranged in inductive relation with said primary winding and a second pair of interrupter contacts, said first and second series circuits being conductively isolated from each other, a "B" and "C" potential supply circuit fed by said secondary winding through said contacts, and a potentiometer in said supply circuit arranged to separate the "B" and "C" bias potentials.

7. A vibrator device comprising a frame, clamping means supported thereon for holding one end of a reed member, a reed member clamped thereby at one of its ends with its other end free to vibrate, said reed member comprising a pair of parallel reeds having their faces in the same plane, individual armature pieces of magnetically permeable material secured to the ends thereof, an insulating strip mechanically secured to both said reeds near the free ends thereof, an electromagnet mounted on said frame adjacent said armature pieces and actuating said reeds, contacts on both said reeds and cooperating contacts mounted on said frame and cooperating with said reed contacts in making and breaking electric circuits.

8. In an electric current converter system wherein a vibratory reed is vibrated by an electromagnet and makes and breaks an electric circuit during its vibratory motion the combination with said vibratory reed of a second vibratory reed mechanically supported in parallel relation alongside the first reed in the same plane and mechanically clamped to said first reed but electrically insulated therefrom, said second reed being vibrated by said electromagnet in unison with said first reed and making and breaking a second electric circuit during its vibratory motion, said first and second electric circuits being inductively associated.

9. In an electric current converter system wherein a vibratory reed is vibrated by an electromagnet and makes and breaks an electric circuit during its vibratory motion the combination with said vibratory reed of a second vibratory reed mechanically supported in parallel relation alongside the first reed in the same plane and mechanically clamped to said first reed but electrically insulated therefrom, said second reed being vibrated by said electromagnet in unison with said first reed and making and breaking a second electric circuit during its vibratory motion, said first and second electric circuits being conductively isolated from each other.

10. In an electric current converter system wherein a vibratory reed is vibrated by an electromagnet and makes and breaks an electric circuit during its vibratory motion the combination with said vibratory reed of a second vibratory reed mechanically supported in parallel relation alongside the first reed in the same plane and mechanically clamped to said first reed but electrically insulated therefrom, said second reed being vibrated by said electromagnet in unison with said first reed and making and breaking a second electric circuit during its vibratory motion, said first and second electric circuits being inductively associated but conductively isolated from each other.

MARVIN E. NULSEN.
DONALD H. MITCHELL.

CERTIFICATE OF CORRECTION.

Patent No. 2,167,084. July 25, 1939.

MARVIN E. NULSEN, ET AL.

It is hereby certified that error appears in the printed specification of the above numbered patent requiring correction as follows: Page 4, first column, line 38, claim 3, for the word "windings" read winding; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.